US011901601B2

(12) United States Patent
Li

(10) Patent No.: US 11,901,601 B2
(45) Date of Patent: Feb. 13, 2024

(54) WAVEGUIDE WITH A ZIGZAG FOR SUPPRESSING GRATING LOBES

(71) Applicant: Aptiv Technologies Limited, St. Michael (BB)

(72) Inventor: Mingjian Li, Santa Clara, CA (US)

(73) Assignee: Aptiv Technologies Limited, St. Michael (BB)

(*) Notice: Subject to any disclaimer, the term of this patent is extended or adjusted under 35 U.S.C. 154(b) by 251 days.

(21) Appl. No.: 17/234,299

(22) Filed: Apr. 19, 2021

(65) Prior Publication Data

US 2022/0200119 A1 Jun. 23, 2022

Related U.S. Application Data

(60) Provisional application No. 63/169,078, filed on Mar. 31, 2021, provisional application No. 63/127,861, filed on Dec. 18, 2020, provisional application No. 63/127,873, filed on Dec. 18, 2020, provisional application No. 63/127,819, filed on Dec. 18, 2020.

(51) Int. Cl.
*H01P 3/12* (2006.01)
*H01Q 13/10* (2006.01)

(52) U.S. Cl.
CPC ............. *H01P 3/121* (2013.01); *H01Q 13/10* (2013.01)

(58) Field of Classification Search
CPC .. H01P 3/12; H01P 3/121; H01P 3/122; H01P 3/123; H01P 3/16; H01P 3/18; H01Q 13/10; H01Q 13/12; H01Q 21/0043; H01Q 1/3233
See application file for complete search history.

(56) References Cited

U.S. PATENT DOCUMENTS 2,851,686 A 9/1958 Hagaman
3,029,432 A 4/1962 Hansen
(Continued)

FOREIGN PATENT DOCUMENTS

CA 2654470 12/2007
CN 1254446 A 5/2000
(Continued)

OTHER PUBLICATIONS

"Extended European Search Report", EP Application No. 18153137.7, dated Jun. 15, 2018, 8 pages.
(Continued)

*Primary Examiner* — Seokjin Kim
(74) *Attorney, Agent, or Firm* — Harness, Dickey & Pierce, P.L.C.

(57) ABSTRACT

This document describes a waveguide with a zigzag for suppressing grating lobes. An apparatus may include a waveguide with a zigzag waveguide channel to suppress grating lobes in diagonal planes of a three-dimensional radiation pattern. The waveguide includes a hollow channel containing a dielectric and an array of radiation slots through a surface that is operably connected with the dielectric. The hollow channel has a zigzag shape along a longitudinal direction through the waveguide. The zigzag waveguide channel and radiation slots configure the described waveguide to suppress grating lobes in an antenna radiation pattern. This document also describes a waveguide formed in part by a printed circuit board to improve the manufacturing process.

6 Claims, 8 Drawing Sheets

(56) References Cited

U.S. PATENT DOCUMENTS

| | | | |
|---|---|---|---|
| 3,032,762 | A | 5/1962 | Kerr |
| 3,328,800 | A | 6/1967 | Algeo |
| 3,462,713 | A | 8/1969 | Knerr |
| 3,473,162 | A | 10/1969 | Veith |
| 3,579,149 | A | 5/1971 | Ramsey |
| 3,594,806 | A | 7/1971 | Black et al. |
| 3,597,710 | A | 8/1971 | Levy |
| 3,852,689 | A | 12/1974 | Watson |
| 4,157,516 | A | 6/1979 | Van De Grijp |
| 4,291,312 | A | 9/1981 | Kaloi |
| 4,453,142 | A | 6/1984 | Murphy |
| 4,562,416 | A | 12/1985 | Sedivec |
| 4,590,480 | A | 5/1986 | Nikolayuk et al. |
| 4,839,663 | A | 6/1989 | Kurtz |
| 5,030,965 | A | 7/1991 | Park et al. |
| 5,047,738 | A | 9/1991 | Wong et al. |
| 5,065,123 | A | 11/1991 | Heckaman et al. |
| 5,068,670 | A | 11/1991 | Maoz |
| 5,113,197 | A | 5/1992 | Luh |
| 5,337,065 | A | 8/1994 | Bonnet et al. |
| 5,350,499 | A | 9/1994 | Shibaike et al. |
| 5,541,612 | A | 7/1996 | Josefsson |
| 5,638,079 | A | 6/1997 | Kastner et al. |
| 5,923,225 | A | 7/1999 | Santos |
| 5,926,147 | A | 7/1999 | Sehm et al. |
| 5,982,256 | A | 11/1999 | Uchimura et al. |
| 5,986,527 | A | 11/1999 | Ishikawa et al. |
| 6,072,375 | A | 6/2000 | Adkins et al. |
| 6,166,701 | A | 12/2000 | Park et al. |
| 6,414,573 | B1 | 7/2002 | Swineford et al. |
| 6,489,855 | B1 | 12/2002 | Kitamori et al. |
| 6,535,083 | B1 | 3/2003 | Hageman et al. |
| 6,622,370 | B1 | 9/2003 | Sherman et al. |
| 6,788,918 | B2 | 9/2004 | Saitoh et al. |
| 6,794,950 | B2 | 9/2004 | Du Tolt et al. |
| 6,859,114 | B2 | 2/2005 | Eleftheriades et al. |
| 6,867,660 | B2 | 3/2005 | Kitamori et al. |
| 6,958,662 | B1 | 10/2005 | Salmela et al. |
| 6,992,541 | B2 | 1/2006 | Wright et al. |
| 7,002,511 | B1 | 2/2006 | Ammar et al. |
| 7,091,919 | B2 | 8/2006 | Bannon |
| 7,142,165 | B2 | 11/2006 | Sanchez et al. |
| 7,420,442 | B1 | 9/2008 | Forman |
| 7,439,822 | B2 | 10/2008 | Shimura et al. |
| 7,495,532 | B2 | 2/2009 | McKinzie, III |
| 7,498,994 | B2 | 3/2009 | Vacanti |
| 7,626,476 | B2 | 12/2009 | Kim et al. |
| 7,659,799 | B2 | 2/2010 | Jun et al. |
| 7,886,434 | B1 | 2/2011 | Forman |
| 7,973,616 | B2 | 7/2011 | Shijo et al. |
| 7,994,879 | B2 | 8/2011 | Kim et al. |
| 8,013,694 | B2 | 9/2011 | Hiramatsu et al. |
| 8,089,327 | B2 | 1/2012 | Margomenos et al. |
| 8,159,316 | B2 | 4/2012 | Miyazato et al. |
| 8,395,552 | B2 | 3/2013 | Geiler et al. |
| 8,451,175 | B2 | 5/2013 | Gummalla et al. |
| 8,451,189 | B1 | 5/2013 | Fluhler |
| 8,576,023 | B1 | 11/2013 | Buckley et al. |
| 8,604,990 | B1 | 12/2013 | Chen et al. |
| 8,692,731 | B2 | 4/2014 | Lee et al. |
| 8,717,124 | B2 | 5/2014 | Vanhille et al. |
| 8,803,638 | B2 | 8/2014 | Kildal |
| 8,948,562 | B2 | 2/2015 | Norris et al. |
| 9,007,269 | B2 | 4/2015 | Lee et al. |
| 9,203,139 | B2 | 12/2015 | Zhu et al. |
| 9,203,155 | B2 | 12/2015 | Choi et al. |
| 9,246,204 | B1 | 1/2016 | Kabakian |
| 9,258,884 | B2 | 2/2016 | Saito |
| 9,356,238 | B2 | 5/2016 | Norris et al. |
| 9,368,878 | B2 | 6/2016 | Chen et al. |
| 9,450,281 | B2 | 9/2016 | Kim |
| 9,537,212 | B2 | 1/2017 | Rosen et al. |
| 9,647,313 | B2 | 5/2017 | Marconi et al. |
| 9,653,773 | B2 | 5/2017 | Ferrari et al. |
| 9,653,819 | B1 | 5/2017 | Izadian |
| 9,673,532 | B2 | 6/2017 | Cheng et al. |
| 9,806,393 | B2 | 10/2017 | Kildal et al. |
| 9,806,431 | B1 | 10/2017 | Izadian |
| 9,813,042 | B2 | 11/2017 | Xue et al. |
| 9,843,301 | B1 | 12/2017 | Rodgers et al. |
| 9,882,288 | B2 | 1/2018 | Black et al. |
| 9,935,065 | B1 | 4/2018 | Baheti et al. |
| 9,991,606 | B2 | 6/2018 | Kirino et al. |
| 9,997,842 | B2 | 6/2018 | Kirino et al. |
| 10,027,032 | B2 | 7/2018 | Kirino et al. |
| 10,042,045 | B2 | 8/2018 | Kirino et al. |
| 10,090,600 | B2 | 10/2018 | Kirino et al. |
| 10,114,067 | B2 | 10/2018 | Lam et al. |
| 10,153,533 | B2 | 12/2018 | Kirino |
| 10,158,158 | B2 | 12/2018 | Kirino et al. |
| 10,164,318 | B2 | 12/2018 | Seok et al. |
| 10,164,344 | B2 | 12/2018 | Kirino et al. |
| 10,186,787 | B1 | 1/2019 | Wang et al. |
| 10,218,078 | B2 | 2/2019 | Kirino et al. |
| 10,230,173 | B2 | 3/2019 | Kirino et al. |
| 10,263,310 | B2 | 4/2019 | Kildal et al. |
| 10,283,832 | B1 | 5/2019 | Chayat et al. |
| 10,312,596 | B2 | 6/2019 | Gregoire |
| 10,315,578 | B2 | 6/2019 | Kim et al. |
| 10,320,083 | B2 | 6/2019 | Kirino et al. |
| 10,333,227 | B2 | 6/2019 | Kirino et al. |
| 10,374,323 | B2 | 8/2019 | Kamo et al. |
| 10,381,317 | B2 | 8/2019 | Maaskant et al. |
| 10,381,741 | B2 | 8/2019 | Kirino et al. |
| 10,439,298 | B2 | 10/2019 | Kirino et al. |
| 10,468,736 | B2 | 11/2019 | Mangaiahgari |
| 10,505,282 | B2 | 12/2019 | Lilja |
| 10,534,061 | B2 | 1/2020 | Vassilev et al. |
| 10,559,889 | B2 | 2/2020 | Kirino et al. |
| 10,594,045 | B2 | 3/2020 | Kirino et al. |
| 10,601,144 | B2 | 3/2020 | Kamo et al. |
| 10,608,345 | B2 | 3/2020 | Kirino et al. |
| 10,613,216 | B2 | 4/2020 | Vacanti et al. |
| 10,622,696 | B2 | 4/2020 | Kamo et al. |
| 10,627,502 | B2 | 4/2020 | Kirino et al. |
| 10,649,461 | B2 | 5/2020 | Han et al. |
| 10,651,138 | B2 | 5/2020 | Kirino et al. |
| 10,651,567 | B2 | 5/2020 | Kamo et al. |
| 10,658,760 | B2 | 5/2020 | Kamo et al. |
| 10,670,810 | B2 | 6/2020 | Sakr et al. |
| 10,705,294 | B2 | 7/2020 | Guerber et al. |
| 10,707,584 | B2 | 7/2020 | Kirino et al. |
| 10,714,802 | B2 | 7/2020 | Kirino et al. |
| 10,727,561 | B2 | 7/2020 | Kirino et al. |
| 10,727,611 | B2 | 7/2020 | Kirino et al. |
| 10,763,590 | B2 | 9/2020 | Kirino et al. |
| 10,763,591 | B2 | 9/2020 | Kirino et al. |
| 10,775,573 | B1 | 9/2020 | Hsu et al. |
| 10,811,373 | B2 | 10/2020 | Zaman et al. |
| 10,826,147 | B2 | 11/2020 | Sikina et al. |
| 10,833,382 | B2 | 11/2020 | Sysouphat |
| 10,833,385 | B2 | 11/2020 | Mangaiahgari et al. |
| 10,892,536 | B2 | 1/2021 | Fan et al. |
| 10,944,184 | B2 | 3/2021 | Shi et al. |
| 10,957,971 | B2 | 3/2021 | Doyle et al. |
| 10,957,988 | B2 | 3/2021 | Kirino et al. |
| 10,962,628 | B1 | 3/2021 | Laifenfeld et al. |
| 10,971,824 | B2 | 4/2021 | Baumgartner et al. |
| 10,983,194 | B1 | 4/2021 | Patel et al. |
| 10,985,434 | B2 | 4/2021 | Wagner et al. |
| 10,992,056 | B2 | 4/2021 | Kamo et al. |
| 11,061,110 | B2 | 7/2021 | Kamo et al. |
| 11,088,432 | B2 | 8/2021 | Seok et al. |
| 11,088,464 | B2 | 8/2021 | Sato et al. |
| 11,114,733 | B2 | 9/2021 | Doyle et al. |
| 11,121,441 | B1 | 9/2021 | Rmili et al. |
| 11,121,475 | B2 | 9/2021 | Yang et al. |
| 11,169,325 | B2 | 11/2021 | Guerber et al. |
| 11,171,399 | B2 | 11/2021 | Alexanian et al. |
| 11,196,171 | B2 | 12/2021 | Doyle et al. |
| 11,201,414 | B2 | 12/2021 | Doyle et al. |
| 11,249,011 | B2 | 2/2022 | Challener |
| 11,283,162 | B2 | 3/2022 | Doyle et al. |
| 11,289,787 | B2 | 3/2022 | Yang |

(56) References Cited

U.S. PATENT DOCUMENTS 11,349,183 B2 5/2022 Rahiminejad et al.
11,349,220 B2 5/2022 Alexanian et al.
11,378,683 B2 7/2022 Alexanian et al.
11,411,292 B2 8/2022 Kirino
11,444,364 B2 9/2022 Shi
11,495,871 B2 11/2022 Vosoogh et al.
11,563,259 B2 1/2023 Alexanian et al.
11,611,138 B2 3/2023 Ogawa et al.
11,616,282 B2 3/2023 Yao et al.
11,626,652 B2 4/2023 Vilenskiy et al.
2002/0021197 A1 2/2002 Elco
2003/0052828 A1 3/2003 Scherzer et al.
2004/0041663 A1 3/2004 Uchimura et al.
2004/0069984 A1 4/2004 Estes et al.
2004/0090290 A1 5/2004 Teshirogi et al.
2004/0174315 A1* 9/2004 Miyata .................. H01Q 13/22 343/770
2005/0146474 A1 7/2005 Bannon
2005/0237253 A1 10/2005 Kuo et al.
2006/0038724 A1 2/2006 Tikhov et al.
2006/0113598 A1 6/2006 Chen et al.
2006/0158382 A1* 7/2006 Nagai ................ H01Q 21/0037 343/786
2007/0013598 A1 1/2007 Artis et al.
2007/0054064 A1 3/2007 Ohmi et al.
2007/0103381 A1 5/2007 Upton
2008/0129409 A1 6/2008 Nagaishi et al.
2008/0150821 A1 6/2008 Koch et al.
2009/0040132 A1 2/2009 Sridhar et al.
2009/0207090 A1 8/2009 Pettus et al.
2009/0243762 A1 10/2009 Chen et al.
2009/0243766 A1 10/2009 Miyagawa et al.
2009/0300901 A1 12/2009 Artis et al.
2010/0134376 A1 6/2010 Margomenos et al.
2010/0321265 A1 12/2010 Yamaguchi et al.
2011/0181482 A1 7/2011 Adams et al.
2012/0013421 A1 1/2012 Hayata
2012/0050125 A1 3/2012 Leiba et al.
2012/0056776 A1 3/2012 Shijo et al.
2012/0068316 A1 3/2012 Ligander
2012/0163811 A1 6/2012 Doany et al.
2012/0194399 A1 8/2012 Bily et al.
2012/0242421 A1 9/2012 Robin et al.
2012/0256796 A1 10/2012 Leiba
2012/0280770 A1 11/2012 Abhari et al.
2013/0057358 A1 3/2013 Anthony et al.
2013/0082801 A1 4/2013 Rofougaran et al.
2013/0300602 A1 11/2013 Zhou et al.
2014/0015709 A1 1/2014 Shijo et al.
2014/0091884 A1 4/2014 Flatters
2014/0106684 A1 4/2014 Burns et al.
2014/0327491 A1 11/2014 Kim et al.
2015/0097633 A1 4/2015 Devries et al.
2015/0229017 A1 8/2015 Suzuki et al.
2015/0229027 A1 8/2015 Sonozaki et al.
2015/0263429 A1 9/2015 Vahidpour et al.
2015/0333726 A1 11/2015 Xue et al.
2015/0357698 A1 12/2015 Kushta
2015/0364804 A1 12/2015 Tong et al.
2015/0364830 A1 12/2015 Tong et al.
2016/0043455 A1 2/2016 Seler et al.
2016/0049714 A1 2/2016 Ligander et al.
2016/0056541 A1 2/2016 Tageman et al.
2016/0118705 A1 4/2016 Tang et al.
2016/0126637 A1* 5/2016 Uemichi ............ H01Q 21/0043 343/771
2016/0195612 A1 7/2016 Shi
2016/0204495 A1 7/2016 Takeda et al.
2016/0211582 A1 7/2016 Saraf
2016/0276727 A1 9/2016 Dang et al.
2016/0293557 A1 10/2016 Topak et al.
2016/0301125 A1 10/2016 Kim et al.
2017/0003377 A1 1/2017 Menge
2017/0012335 A1 1/2017 Boutayeb
2017/0084554 A1 3/2017 Dogiamis et al.
2017/0288313 A1 10/2017 Chung et al.
2017/0294719 A1 10/2017 Tatomir
2017/0324135 A1 11/2017 Blech et al.
2018/0013208 A1 1/2018 Izadian et al.
2018/0032822 A1 2/2018 Frank et al.
2018/0123245 A1 5/2018 Toda et al.
2018/0131084 A1 5/2018 Park et al.
2018/0212324 A1 7/2018 Tatomir
2018/0226709 A1 8/2018 Mangaiahgari
2018/0233465 A1 8/2018 Spella et al.
2018/0254563 A1 9/2018 Sonozaki et al.
2018/0284186 A1 10/2018 Chadha et al.
2018/0301819 A1 10/2018 Kirino et al.
2018/0301820 A1 10/2018 Bregman et al.
2018/0343711 A1 11/2018 Wixforth et al.
2018/0351261 A1 12/2018 Kamo et al.
2018/0375185 A1 12/2018 Kirino et al.
2019/0006743 A1 1/2019 Kirino et al.
2019/0013563 A1 1/2019 Takeda et al.
2019/0057945 A1 2/2019 Maaskant et al.
2019/0109361 A1 4/2019 Ichinose et al.
2019/0115644 A1 4/2019 Wang et al.
2019/0187247 A1 6/2019 Izadian et al.
2019/0245276 A1 8/2019 Li et al.
2019/0252778 A1 8/2019 Duan
2019/0260137 A1 8/2019 Watanabe et al.
2019/0324134 A1 10/2019 Cattle
2020/0021001 A1 1/2020 Mangaiahgairi
2020/0044360 A1 2/2020 Kamo et al.
2020/0059002 A1 2/2020 Renard et al.
2020/0064483 A1 2/2020 Li et al.
2020/0076086 A1 3/2020 Cheng et al.
2020/0106171 A1 4/2020 Shepeleva et al.
2020/0112077 A1 4/2020 Kamo et al.
2020/0166637 A1 5/2020 Hess et al.
2020/0203849 A1 6/2020 Lim et al.
2020/0212594 A1 7/2020 Kirino et al.
2020/0235453 A1 7/2020 Lang
2020/0284907 A1 9/2020 Gupta et al.
2020/0287293 A1 9/2020 Shi et al.
2020/0319293 A1 10/2020 Kuriyama et al.
2020/0343612 A1 10/2020 Shi
2020/0346581 A1 11/2020 Lawson et al.
2020/0373678 A1* 11/2020 Park ........................ H01P 3/121
2021/0028528 A1 1/2021 Alexanian et al.
2021/0036393 A1 2/2021 Mangaiahgari
2021/0104818 A1 4/2021 Li et al.
2021/0110217 A1 4/2021 Gunel
2021/0159577 A1 5/2021 Carlred et al.
2021/0218154 A1 7/2021 Shi et al.
2021/0242581 A1 8/2021 Rossiter et al.
2021/0249777 A1 8/2021 Alexanian et al.
2021/0305667 A1 9/2021 Bencivenni
2022/0094071 A1 3/2022 Doyle et al.
2022/0109246 A1 4/2022 Emanuelsson et al.
2022/0196794 A1 6/2022 Foroozesh et al.

FOREIGN PATENT DOCUMENTS

CN 1620738 5/2005
CN 2796131 7/2006
CN 101584080 A 11/2009
CN 201383535 1/2010
CN 201868568 U 6/2011
CN 102157787 A 8/2011
CN 102420352 A 4/2012
CN 103326125 A 9/2013
CN 203277633 U 11/2013
CN 103490168 A 1/2014
CN 103515682 1/2014
CN 102142593 B 6/2014
CN 104101867 A 10/2014
CN 104900956 9/2015
CN 104993254 A 10/2015
CN 105071019 A 11/2015
CN 105609909 5/2016
CN 105680133 6/2016
CN 105958167 9/2016
CN 107317075 A 11/2017

(56) References Cited

FOREIGN PATENT DOCUMENTS

| | | | | |
|---|---|---|---|---|
| CN | 108258392 | A | | 7/2018 |
| CN | 109286081 | A | | 1/2019 |
| CN | 109643856 | A | | 4/2019 |
| CN | 109980361 | A | | 7/2019 |
| CN | 110085990 | A | | 8/2019 |
| CN | 209389219 | | | 9/2019 |
| CN | 110401022 | A | | 11/2019 |
| CN | 111123210 | A | | 5/2020 |
| CN | 111480090 | A | | 7/2020 |
| CN | 108376821 | B | | 10/2020 |
| CN | 110474137 | B | | 11/2020 |
| CN | 109326863 | B | | 12/2020 |
| CN | 112241007 | A | | 1/2021 |
| CN | 212604823 | U | | 2/2021 |
| CN | 112986951 | A | | 6/2021 |
| CN | 112290182 | B | | 7/2021 |
| CN | 113193323 | B | | 10/2021 |
| CN | 214706247 | U | | 11/2021 |
| DE | 112017006415 | | | 9/2019 |
| DE | 102019200893 | | | 7/2020 |
| EP | 0174579 | A2 | | 3/1986 |
| EP | 0818058 | A1 | | 1/1998 |
| EP | 2267841 | A1 | | 12/2010 |
| EP | 2500978 | | | 9/2012 |
| EP | 2843758 | | | 3/2015 |
| EP | 2766224 | B1 | | 12/2018 |
| EP | 3460903 | | | 3/2019 |
| EP | 3785995 | A1 | | 3/2021 |
| EP | 3862773 | A1 | | 8/2021 |
| EP | 4089840 | A1 | | 11/2022 |
| GB | 893008 | A | | 4/1962 |
| GB | 2463711 | A | | 3/2010 |
| GB | 2489950 | | | 10/2012 |
| JP | 2000183222 | A | | 6/2000 |
| JP | 2003198242 | A | | 7/2003 |
| JP | 2003289201 | | | 10/2003 |
| JP | 5269902 | B2 | | 8/2013 |
| JP | 2013187752 | A | | 9/2013 |
| JP | 2013187752 | A | * | 9/2013 |
| JP | 2015216533 | A | | 12/2015 |
| KR | 100846872 | | | 5/2008 |
| KR | 1020080044752 | A | | 5/2008 |
| KR | 20080105396 | A | | 12/2008 |
| KR | 101092846 | B1 | | 12/2011 |
| KR | 102154338 | B1 | | 9/2020 |
| WO | 9934477 | A1 | | 7/1999 |
| WO | 2013189513 | | | 12/2013 |
| WO | 2018003932 | | | 1/2018 |
| WO | 2018052335 | A1 | | 3/2018 |
| WO | 2019085368 | A1 | | 5/2019 |
| WO | 2020082363 | A1 | | 4/2020 |
| WO | 2021072380 | A1 | | 4/2021 |
| WO | 2022122319 | A1 | | 6/2022 |
| WO | 2022225804 | A1 | | 10/2022 |

OTHER PUBLICATIONS

"Extended European Search Report", EP Application No. 20166797, dated Sep. 16, 2020, 11 pages.
"Foreign Office Action", CN Application No. 201810122408.4, dated Jun. 2, 2021, 15 pages.
"Non-Final Office Action", U.S. Appl. No. 16/583,867, dated Feb. 18, 2020, 8 pages.
"Non-Final Office Action", U.S. Appl. No. 15/427,769, dated Nov. 13, 2018, 8 pages.
"Notice of Allowance", U.S. Appl. No. 15/427,769, dated Jun. 28, 2019, 9 pages.
"Notice of Allowance", U.S. Appl. No. 16/583,867, dated Jul. 8, 2020, 8 Pages.
Jankovic, et al., "Stepped Bend Substrate Integrated Waveguide to Rectangular Waveguide Transitions", Jun. 2016, 2 pages.
"WR-90 Waveguides", Pasternack Enterprises, Inc., 2016, Retrieved from https://web.archive.org/ web/20160308205114/http://www.pasternack.com:80/wr-90-waveguides-category.aspx, 2 pages.
Gray, et al., "Carbon Fibre Reinforced Plastic Slotted Waveguide Antenna", Proceedings of Asia-Pacific Microwave Conference 2010, pp. 307-310.
"Extended European Search Report", EP Application No. 20155296.5, dated Jul. 13, 2020, 12 pages.
"Extended European Search Report", EP Application No. 21212703.9, dated May 3, 2022, 13 pages.
"Extended European Search Report", EP Application No. 21215901.6, dated Jun. 9, 2022, 8 pages.
"Extended European Search Report", EP Application No. 22160898.7, dated Aug. 4, 2022, 11 pages.
"Extended European Search Report", EP Application No. 22183888.1, dated Dec. 20, 2022, 10 pages.
"Extended European Search Report", EP Application No. 22183892.3, dated Dec. 2, 2022, 8 pages.
"Extended European Search Report", EP Application No. 22184924.3, dated Dec. 2, 2022, 13 pages.
"Foreign Office Action", CN Application No. 202010146513.9, dated Feb. 7, 2022, 14 pages.
Bauer, et al., "A wideband transition from substrate integrated waveguide to differential microstrip lines in multilayer substrates", Sep. 2010, pp. 811-813.
Chaloun, et al., "A Wideband 122 GHz Cavity-Backed Dipole Antenna for Millimeter-Wave Radar Altimetry", 2020 14th European Conference on Antennas and Propagation (EUCAP), Mar. 15, 2020, 4 pages.
Deutschmann, et al., "A Full W-Band Waveguide-to-Differential Microstrip Transition", Jun. 2019, pp. 335-338.
Furtula, et al., "Waveguide Bandpass Filters for Millimeter-Wave Radiometers", Journal of Infrared, Millimeter and Terahertz Waves, 2013, 9 pages.
Giese, et al., "Compact Wideband Single-ended and Differential Microstrip-to-waveguide Transitions at W-band", Jul. 2015, 4 pages.
Hansen, et al., "D-Band FMCW Radar Sensor for Industrial Wideband Applications with Fully-Differential MMIC-to-RWG Interface in SIW", 2021 IEEE/MTT-S International Microwave Symposium, Jun. 7, 2021, pp. 815-818.
Hasan, et al., "F-Band Differential Microstrip Patch Antenna Array and Waveguide to Differential Microstrip Line Transition for FMCW Radar Sensor", IEEE Sensors Journal, vol. 19, No. 15, Aug. 1, 2019, pp. 6486-6496.
Huang, et al., "The Rectangular Waveguide Board Wall Slot Array Antenna Integrated with One Dimensional Subwavelength Periodic Corrugated Grooves and Artificially Soft Surface Structure", Dec. 20, 2008, 10 pages.
Lin, et al., "A THz Waveguide Bandpass Filter Design Using an Artificial Neural Network", Micromachines 13(6), May 2022, 11 pages.
Ogiwara, et al., "2-D MoM Analysis of the Choke Structure for Isolation Improvement between Two Waveguide Slot Array Antennas", Proceedings of Asia-Pacific Microwave Conference 2007, 4 pages.
Razmhosseini, et al., "Parasitic Slot Elements for Bandwidth Enhancement of Slotted Waveguide Antennas", 2019 IEEE 90th Vehicular Technology Conference, Sep. 2019, 5 pages.
Schneider, et al., "A Low-Loss W-Band Frequency-Scanning Antenna for Wideband Multichannel Radar Applications", IEEE Antennas and Wireless Propagation Letters, vol. 18, No. 4, Apr. 2019, pp. 806-810.
Serrano, et al., "Lowpass Filter Design for Space Applications in Waveguide Technology Using Alternative Topologies", Jan. 2013, 117 pages.
Tong, et al., "A Wide Band Transition from Waveguide to Differential Microstrip Lines", Dec. 2008, 5 pages.
Wang, et al., "A 79-GHz LTCC differential microstrip line to laminated waveguide transition using high permittivity material", Dec. 2010, pp. 1593-1596.
Wu, et al., "The Substrate Integrated Circuits—A New Concept for High-Frequency Electronics and Optoelectronics", Dec. 2003, 8 pages.
Yuasa, et al., "A millimeter wave wideband differential line to waveguide transition using short ended slot line", Oct. 2014, pp. 1004-1007.

(56) References Cited

OTHER PUBLICATIONS

"Foreign Office Action", CN Application No. 201810122408.4, dated Oct. 18, 2021, 19 pages.
"Non-Final Office Action", U.S. Appl. No. 16/829,409, dated Oct. 14, 2021, 13 pages.
"Non-Final Office Action", U.S. Appl. No. 17/061,675, dated Dec. 20, 2021, 4 pages.
Wang, et al., "Mechanical and Dielectric Strength of Laminated Epoxy Dielectric Graded Materials", Mar. 2020, 15 pages.
"Extended European Search Report", EP Application No. 21211474.8, dated Apr. 20, 2022, 14 pages.
"Extended European Search Report", EP Application No. 21216319.0, dated Jun. 10, 2022, 12 pages.
"Extended European Search Report", EP Application No. 22166998.9, dated Sep. 9, 2022, 12 pages.
Adams, et al., "Dual Band Frequency Scanned, Height Finder Antenna", 1991 21st European Microwave Conference, 1991, 6 pages.
Hausman, "Termination Insensitive Mixers", 2011 IEEE International Conference on Microwaves, Communications, Antennas and Electronic Systems (COMCAS 2011), Nov. 7, 2011, 13 pages.
Wang, et al., "Low-loss frequency scanning planar array with hybrid feeding structure for low-altitude detection radar", Sep. 13, 2019, pp. 6708-6711.
Yu, et al., "Optimization and Implementation of SIW Slot Array for Both Medium-and Long-Range 77 GHz Automotive Radar Application", IEEE Transactions on Antennas and Propagation, vol. 66, No. 7, Jul. 2018, pp. 3769-3774.
"Extended European Search Report", EP Application No. 21211165.2, dated May 13, 2022, 12 pages.
"Extended European Search Report", EP Application No. 21211167.8, dated May 19, 2022, 10 pages.
"Extended European Search Report", EP Application No. 21211168.6, dated May 13, 2022, 11 pages.
"Extended European Search Report", EP Application No. 21211452.4, dated May 16, 2022, 10 pages.
"Extended European Search Report", EP Application No. 21211478.9, dated May 19, 2022, 10 pages.
Alhuwaimel, et al., "Performance Enhancement of a Slotted Waveguide Antenna by Utilizing Parasitic Elements", Sep. 7, 2015, pp. 1303-1306.
Li, et al., "Millimetre-wave slotted array antenna based on double-layer substrate integrated waveguide", Jun. 1, 2015, pp. 882-888.
Mak, et al., "A Magnetoelectric Dipole Leaky-Wave Antenna for Millimeter-Wave Application", Dec. 12, 2017, pp. 6395-6402.
Mallahzadeh, et al., "A Low Cross-Polarization Slotted Ridged SIW Array Antenna Design With Mutual Coupling Considerations", Jul. 17, 2015, pp. 4324-4333.
Rossello, et al., "Substrate Integrated Waveguide Aperture Coupled Patch Antenna Array for 24 GHz Wireless Backhaul and Radar Applications", Nov. 16, 2014, 2 pages.
Shehab, et al., "Substrate-Integrated-Waveguide Power Dividers", Oct. 15, 2019, pp. 27-38.
Wu, et al., "A Planar W-Band Large-Scale High-Gain Substrate-Integrated Waveguide Slot Array", Feb. 3, 2020, pp. 6429-6434.
Xu, et al., "CPW Center-Fed Single-Layer SIW Slot Antenna Array for Automotive Radars", Jun. 12, 2014, pp. 4528-4536.
"Foreign Office Action", CN Application No. 202111550163.3, dated Jun. 17, 2023, 25 pages.
"Foreign Office Action", CN Application No. 202111550448.7, dated Jun. 17, 2023, 19 pages.
"Foreign Office Action", CN Application No. 202111551711.4, dated Jun. 17, 2023, 29 pages.
"Foreign Office Action", CN Application No. 202111551878.0, dated Jun. 15, 2023, 20 pages.
"Foreign Office Action", CN Application No. 202111563233.9, dated May 31, 2023, 15 pages.
"Foreign Office Action", CN Application No. 202111652507.1, dated Jun. 26, 2023, 14 pages.
"Foreign Office Action", CN Application No. 202210251362.2, dated Jun. 28, 2023, 15 pages.
Hausman, et al., "Termination Insensitive Mixers", 2011 IEEE International Conference on Microwaves, Communications, Antennas and Electronic Systems (COMCAS 2011), Dec. 19, 2011, 13 pages.
"Extended European Search Report", EP Application No. 23158037.4, dated Aug. 17, 2023, 9 pages.
"Extended European Search Report", EP Application No. 23158947.4, dated Aug. 17, 2023, 11 pages.
Aulia Dewantari et al., "Flared SIW antenna design and transceiving experiments for W-band SAR", International Journal of RF and Microwave Computer-Aided Engineering, Wiley Interscience, Hoboken, USA, vol. 28, No. 9, May 9, 2018, XP072009558.
Ghassemi, et al., "Millimeter-Wave Integrated Pyramidal Horn Antenna Made of Multilayer Printed Circuit Board (PCB) Process", IEEE Transactions on Antennas and Propagation, vol. 60, No. 9, Sep. 2012, pp. 4432-4435.

* cited by examiner

WAVEGUIDE WITH A ZIGZAG FOR SUPPRESSING GRATING LOBES

CROSS-REFERENCE TO RELATED APPLICATIONS

This application claims the benefit under 35 U.S.C. 119(e) of U.S. Provisional Application No. 63/169,078, filed Mar. 31, 2021, and U.S. Provisional Application Nos. 63/127,819, 63/127,861, and 63/127,873, each filed Dec. 18, 2020, the disclosures of which are hereby incorporated by reference in their entirety herein.

BACKGROUND

Some devices (e.g., radar systems) use electromagnetic (EM) signals to detect and track objects. The EM signals are transmitted and received using one or more antennas. Many automotive applications use radar systems to detect objects near the vehicle (e.g., in a particular portion of a travel path of the vehicle). Some automotive radar systems use a waveguide slot array antenna to avoid loss (e.g., dielectric loss and metal loss) associated with substrate integrated waveguide (SIW) slot arrays and microstrip line-fed patch arrays. Such waveguides may suffer from grating lobes in the three-dimensional radiation pattern of the antenna. These grating lobes can cause automotive radar systems to malfunction, resulting in an inability to detect nearby objects.

SUMMARY

This document describes techniques, apparatuses, and systems for a waveguide with a zigzag for suppressing grating lobes. An apparatus may include a waveguide for providing a three-dimensional radiation pattern. The waveguide includes a hollow channel containing a dielectric. The hollow channel includes an opening in a longitudinal direction through the waveguide at one end and a closed wall at an opposite end of the waveguide. The hollow channel forms a zigzag shape along the longitudinal direction. The waveguide also includes an array of radiation slots that each provide an opening through a surface of the waveguide that defines the hollow channel. The openings of the radiation slots are operably connected with the dielectric. The zigzag waveguide channel and the radiation slots configure the described waveguide to suppress grating lobes in an antenna radiation pattern.

This document also describes methods performed by the above-summarized techniques, apparatuses, and systems, and other methods set forth herein, as well as means for performing these methods.

This Summary introduces simplified concepts related to a waveguide with a zigzag for suppressing grating lobes, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a waveguide with a zigzag for suppressing grating lobes are described in this document with reference to the following figures. The same numbers are often used throughout the drawings to reference like features and components.

DETAILED DESCRIPTION

Overview

Figure 1:
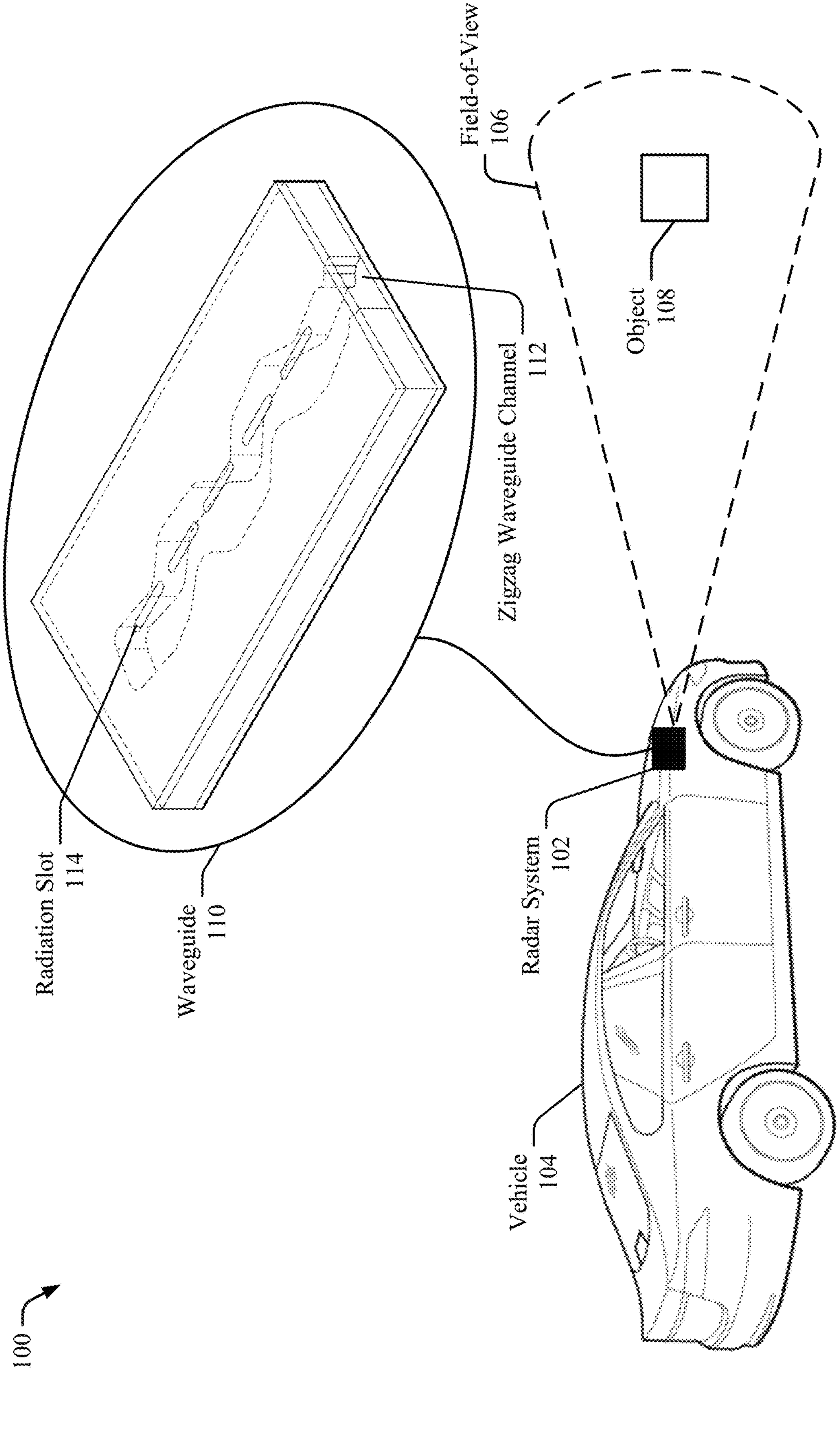
FIG. 1 illustrates an example environment in which a radar system with a waveguide including a zigzag for suppressing grating lobes is used on a vehicle, in accordance with techniques, apparatuses, and systems of this disclosure.

Radar systems are a sensing technology that some automotive systems rely on to acquire information about the surrounding environment. Radar systems generally use an antenna to direct EM energy or signals being transmitted or received. Such radar systems can use multiple antenna elements in an array to provide increased gain and directivity in comparison to the radiation pattern achievable with a single antenna element. Signals from the multiple antenna elements are combined with appropriate phases and weighted amplitudes to provide the desired radiation pattern.

Consider a waveguide used to transfer EM energy to and from the antenna elements. The waveguide generally includes an array of radiation slots (also sometimes referred to as "radiating slots") representing apertures in the waveguide. Manufacturers may select the number and arrangement of the radiation slots to provide the desired phasing, combining, or splitting of EM energy. For example, the radiation slots are equally spaced at a wavelength distance apart in a waveguide surface along a propagation direction of the EM energy. This arrangement of radiation slots generally provides a wide radiation pattern with relatively uniform radiation in the azimuth plane but may also includes grating lobes in the three-dimensional radiation pattern. The grating lobes can have approximately the same intensity as the main lobe in the radiation pattern and cause a radar system to malfunction.

This document describes a waveguide with a zigzag for suppressing grating lobes in the three-dimensional radiation pattern of a radar system. The waveguide includes a hollow channel for a dielectric. The hollow channel includes an opening in a longitudinal direction through the waveguide and a closed wall at an opposite end of the waveguide. The hollow channel forms a zigzag shape along the longitudinal direction. The waveguide also includes multiple radiation slots that form an opening through a surface that defines the hollow channel. The zigzag waveguide channel allows the radiation slots to be aligned along the longitudinal direction.

The zigzag waveguide channel also suppress grating lobes in the radiation pattern of the described radar system.

The described waveguide may be particularly advantageous for use in an automotive context, for example, detecting objects in a roadway in a travel path of a vehicle. The suppression of grating lobes allows a radar system of the vehicle to avoid large sidelobes that can cause the radar system to malfunction and fail to detect objects. As one example, a radar system placed near the front of a vehicle can use the zigzag waveguide to provide a three-dimensional radiation pattern with minimal sidelobes in order to detect objects immediately in front of the vehicle.

This example waveguide is just one example of the described techniques, apparatuses, and systems of a waveguide with a zigzag waveguide channel for suppressing grating lobes. This document describes other examples and implementations.

Operating Environment

FIG. 1 illustrates an example environment 100 in which a radar system 102 with a zigzag for suppressing grating lobes is used on a vehicle 104, in accordance with techniques, apparatuses, and systems of this disclosure. The vehicle 104 may use a waveguide 110 to enable operations of the radar system 102 that is configured to determine a proximity, an angle, or a velocity of one or more objects 108 in the proximity of the vehicle 104.

Although illustrated as a car, the vehicle 104 can represent other types of motorized vehicles (e.g., a motorcycle, a bus, a tractor, a semi-trailer truck, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In general, manufacturers can mount the radar system 102 to any moving platform, including moving machinery or robotic equipment. In other implementations, other devices (e.g., desktop computers, tablets, laptops, televisions, computing watches, smartphones, gaming systems, and so forth) may incorporate the radar system 102 with the waveguide 110 and support techniques described herein.

In the depicted environment 100, the radar system 102 is mounted near, or integrated within, a front portion of the vehicle 104 to detect the object 108 and avoid collisions. The radar system 102 provides a field-of-view 106 towards the one or more objects 108. The radar system 102 can project the field-of-view 106 from any exterior surface of the vehicle 104. For example, vehicle manufacturers can integrate the radar system 102 into a bumper, side mirror, headlights, rear lights, or any other interior or exterior location where the object 108 requires detection. In some cases, the vehicle 104 includes multiple radar systems 102, such as a first radar system 102 and a second radar system 102 that provide a larger field-of-view 106. In general, vehicle manufacturers can design the locations of the one or more radar systems 102 to provide a particular field-of-view 106 that encompasses a region of interest, including, for instance, in or around a travel lane aligned with a vehicle path.

Example fields-of-view 106 include a 360-degree field-of-view, one or more 180-degree fields-of-view, one or more 90-degree fields-of-view, and so forth, which can overlap or be combined into a field-of-view 106 of a particular size. As described above, the described waveguide 110 includes a zigzag waveguide channel 112 and multiple radiation slots 114 to provide a radiation pattern with suppressed grating lobes in the three-dimensional radiation pattern of the radar system 102. As one example, a radar system 102 placed near the front corner (e.g., the front left corner) of a vehicle 104 can use the radiation pattern to focus on detecting objects immediately in front of the vehicle and avoid potential malfunction caused by grating lobes. For example, the zigzag waveguide channel 112 can concentrate the radiated EM energy within 60 degrees of a diagonal plane. In contrast, a waveguide without the described zigzag waveguide channel 112 may provide a radiation pattern with large side lobes (e.g., grating lobes) at around ±60 degrees and cause the radar system 102 to malfunction or inaccurately detect objects 108 in the travel path of the vehicle 104.

The object 108 is composed of one or more materials that reflect radar signals. Depending on the application, the object 108 can represent a target of interest. In some cases, the object 108 can be a moving object or a stationary object. The stationary objects can be continuous (e.g., a concrete barrier, a guard rail) or discontinuous (e.g., a traffic cone) along a road portion.

The radar system 102 emits EM radiation by transmitting one or more EM signals or waveforms via the radiation slots 114. In the environment 100, the radar system 102 can detect and track the object 108 by transmitting and receiving one or more radar signals. For example, the radar system 102 can transmit EM signals between 100 and 400 gigahertz (GHz), between 4 and 100 GHz, or between approximately 70 and 80 GHz.

The radar system 102 can determine a distance to the object 108 based on the time it takes for the signals to travel from the radar system 102 to the object 108 and from the object 108 back to the radar system 102. The radar system 102 can also determine the location of the object 108 in terms of an angle based on the direction of a maximum amplitude echo signal received by the radar system 102.

The radar system 102 can be part of the vehicle 104. The vehicle 104 can also include at least one automotive system that relies on data from the radar system 102, including a driver-assistance system, an autonomous-driving system, or a semi-autonomous-driving system. The radar system 102 can include an interface to the automotive systems. The radar system 102 can output, via the interface, a signal based on EM energy received by the radar system 102.

Generally, the automotive systems use radar data provided by the radar system 102 to perform a function. For example, the driver-assistance system can provide blind-spot monitoring and generate an alert indicating a potential collision with the object 108 detected by the radar system 102. In this case, the radar data from the radar system 102 indicates when it is safe or unsafe to change lanes. The autonomous-driving system may move the vehicle 104 to a particular location on the road while avoiding collisions with the object 108 detected by the radar system 102. The radar data provided by the radar system 102 can provide information about a distance to and the location of the object 108 to enable the autonomous-driving system to perform emergency braking, perform a lane change, or adjust the speed of the vehicle 104.

The radar system 102 generally includes a transmitter (not illustrated) and at least one antenna, including the waveguide 110, to transmit EM signals. The radar system 102 generally includes a receiver (not illustrated) and at least one antenna, including the waveguide 110, to receive reflected versions of these EM signals. The transmitter includes components for emitting EM signals. The receiver includes components to detect the reflected EM signals. The transmitter and the receiver can be incorporated together on the same integrated circuit (e.g., a transceiver integrated circuit) or separately on different integrated circuits.

The radar system 102 also includes one or more processors (not illustrated) and computer-readable storage media (CRM) (not illustrated). The processor can be a microprocessor or a system-on-chip. The processor executes instructions stored within the CRM. As an example, the processor can control the operation of the transmitter. The processor can also process EM energy received by the antenna and determine the location of the object 108 relative to the radar system 102. The processor can also generate radar data for the automotive systems. For example, the processor can control, based on processed EM energy from the antenna, an autonomous or semi-autonomous driving system of the vehicle 104.

The waveguide 110 includes at least one layer that can be any solid material, including wood, carbon fiber, fiberglass, metal, plastic, or a combination thereof. The waveguide 110 can also include a printed circuit board (PCB). The waveguide 110 is designed to mechanically support and electrically connect components (e.g., the zigzag waveguide channel 112, the radiation slots 114) to a dielectric using conductive materials. The zigzag waveguide channel 112 includes a hollow channel to contain the dielectric (e.g., air). The radiation slots 114 provide an opening through a layer or surface of the waveguide 110. The radiation slots 114 are configured to allow EM energy to dissipate to the environment 100 from the dielectric in the zigzag waveguide channel 112. The EM energy dissipates through the radiation slots 114 to produce a three-dimensional radiation pattern within the field-of-view 106 with grating lobes suppressed or eliminated.

This document describes example embodiments of the waveguide 110 to suppress grating lobes in an antenna radiation pattern in greater detail with respect to FIGS. 2 through 4 and 7. The suppression of grating lobes in the radiation pattern allows a radar system 102 of the vehicle 104 to detect objects 108 in a particular portion of the field-of-view 106 (e.g., immediately in front of the vehicle) without potential misidentification of the objects 108 or malfunction.

Figure 2A:
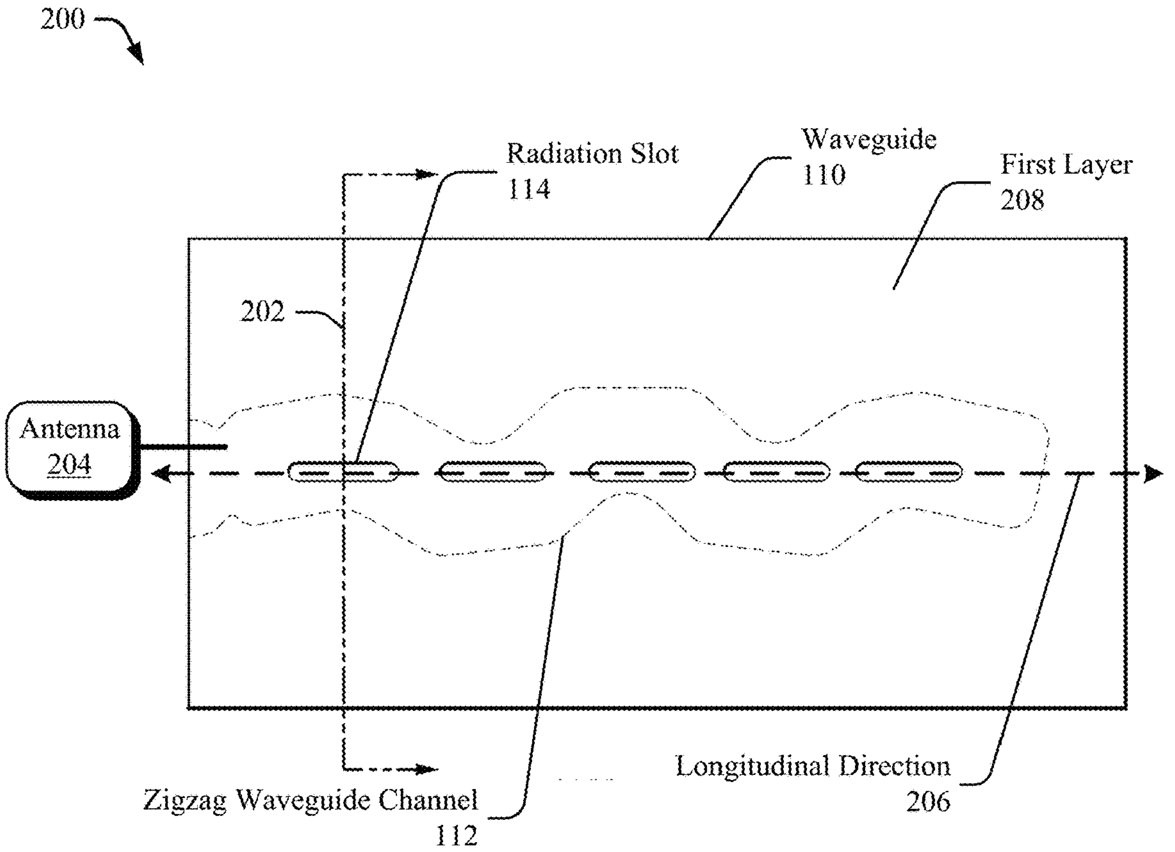
FIGS. 2A and 2B illustrate a top view and a cross-section view, respectively, of a waveguide with a zigzag waveguide channel for suppressing grating lobes.
Figure 2B:
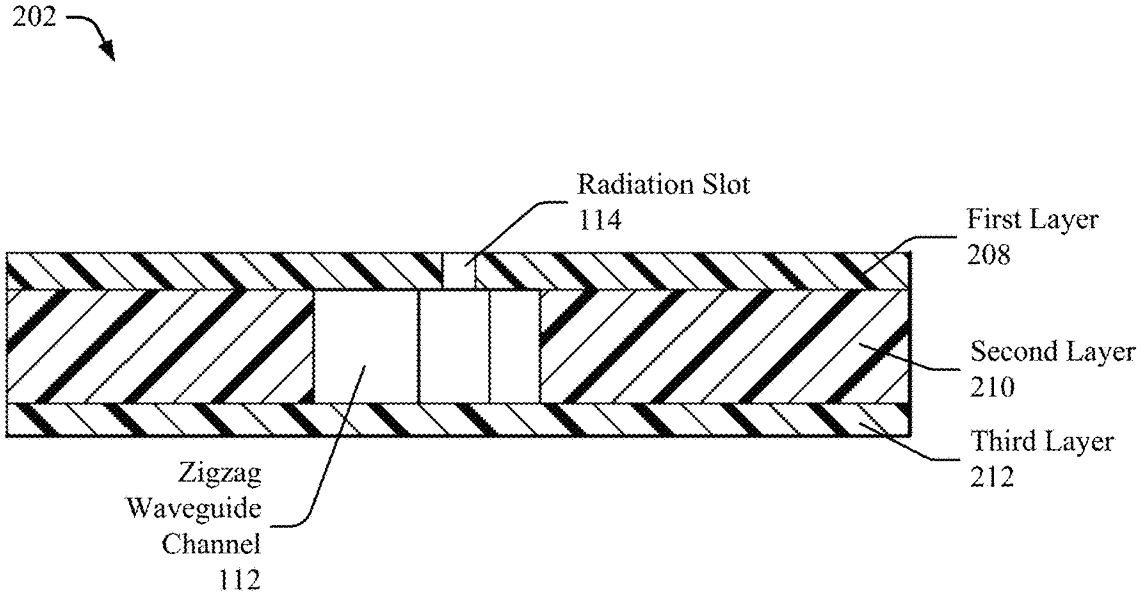

FIGS. 2A and 2B illustrate a top view 200 and a cross-section view 202, respectively, of the waveguide 110 with the zigzag waveguide channel 112 for suppressing grating lobes. As described with respect to FIG. 1, the waveguide 110 includes the zigzag waveguide channel 112 and multiple radiation slots 114.

The zigzag waveguide channel 112 is configured to channel EM signals transmitted by the transmitter and an antenna 204. The antenna 204 can be electrically coupled to a floor of the zigzag waveguide channel 112. The floor of the zigzag waveguide channel 112 is opposite a first layer 208, through which the radiation slots are formed.

The zigzag waveguide channel 112 can include a hollow channel for a dielectric. The dielectric generally includes air, and the waveguide 110 is an air waveguide. The zigzag waveguide channel 112 forms an opening in a longitudinal direction 206 at one end of the waveguide 110 and a closed wall at an opposite end. The antenna 204 is electrically coupled to the dielectric via the floor of the zigzag waveguide channel 112. EM signals enter the zigzag waveguide channel 112 through the opening and exit the zigzag waveguide channel 112 via the radiation slots 114.

As illustrated in FIG. 2A, the zigzag waveguide channel 112 forms a zigzag shape in the longitudinal direction 206. The zigzag shape of the zigzag waveguide channel 112 can reduce or eliminate grating lobes in the radiation pattern that a straight or rectangular waveguide shape can introduce. The turns in the zigzag shape can include various turning angles to provide the zigzag shape in the longitudinal direction 206. The zigzag shape may include multiple turns along the longitudinal direction, for example, with each of the multiple turns having a turning angle between 0 and 90 degrees.

The radiation slots 114 provide an opening through a first layer 208 that defines a surface of the zigzag waveguide channel 112. For example, the radiation slots 114 can have an approximately rectangular shape (e.g., a longitudinal slot parallel to the longitudinal direction 206) as illustrated in FIG. 2A. The longitudinal slots allow the radiation slots 114 to produce a horizontal-polarized radiation pattern. The radiation slots 114 can have other shapes in other implementations, including approximately circular, oval, or square.

The radiation slots 114 are sized and positioned on or in the first layer 208 to produce a particular radiation pattern for the antenna 204. For example, the plurality of radiation slots 114 can be evenly distributed along the zigzag waveguide channel 112 between the opening of the zigzag waveguide channel 112 and the closed wall. Each adjacent pair of radiation slots 114 is separated along the longitudinal direction 206 by a uniform distance to produce a particular radiation pattern. The uniform distance, which is generally less than one wavelength of the electromagnetic radiation, can further suppress grating lobes in the radiation pattern. The zigzag shape of the zigzag waveguide channel 112 allows manufacturers to position the radiation slots 114 in an approximately straight line along the longitudinal direction 206. As another example, the radiation slots 114 nearer the wall at the opposite end of the zigzag waveguide channel 112 can have a larger longitudinal opening than the radiation slots 114 nearer the opening of the zigzag waveguide channel 112. The specific size and position of the radiation slots 114 can be determined by building and optimizing a model of the waveguide 110 to produce the desired radiation pattern.

FIG. 2B illustrates the cross-section view 202 of the waveguide 110 with the zigzag waveguide channel 112 for suppressing grating lobes. The waveguide 110 includes the first layer 208, a second layer 210, and a third layer 212. The first layer 208, the second layer 210, and the third layer 212 can be metal or metal-plated material. The radiation slots 114 form openings in the first layer 208 into the zigzag waveguide channel 112. The second layer 210 forms sides of the zigzag waveguide channel 112. The third layer 212 forms the floor of the zigzag waveguide channel 112. In the depicted implementation, the first layer 208, the second layer 210, and the third layer 212 are separate layers. In other implementations, the first layer 208, the second layer 210, and the third layer 212 can be formed as a single layer that defines the zigzag waveguide channel 112 and the radiation slots 114.

As depicted in FIG. 2B, the zigzag waveguide channel 112 forms an approximately rectangular opening in the cross-section view 202 of the waveguide 110. In other implementations, the zigzag waveguide channel 112 can form an approximately square, oval, or circular opening in the cross-section view 202. In other words, the opening to the zigzag waveguide channel 112 can have an approximately square shape, oval shape, or circular shape.

Figure 3A:
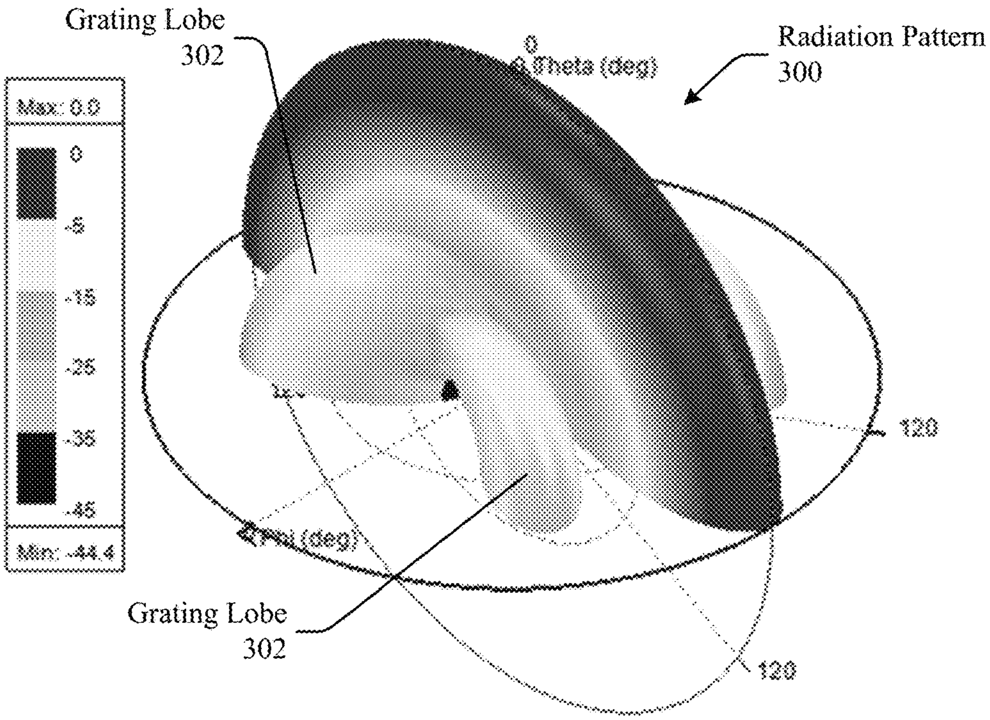
FIGS. 3A and 3B illustrate three-dimensional radiation patterns associated with example radar systems with and without zigzag waveguide channels, respectively.

FIG. 3A illustrates a three-dimensional radiation pattern 300 associated with an example waveguide with a straight waveguide channel. The three-dimensional radiation pattern 300 includes grating lobes 302 in diagonal planes. As described in greater detail with respect to FIG. 4, the grating lobes have a relatively large intensity value and can cause the radar system 102 to malfunction.

Figure 3B:
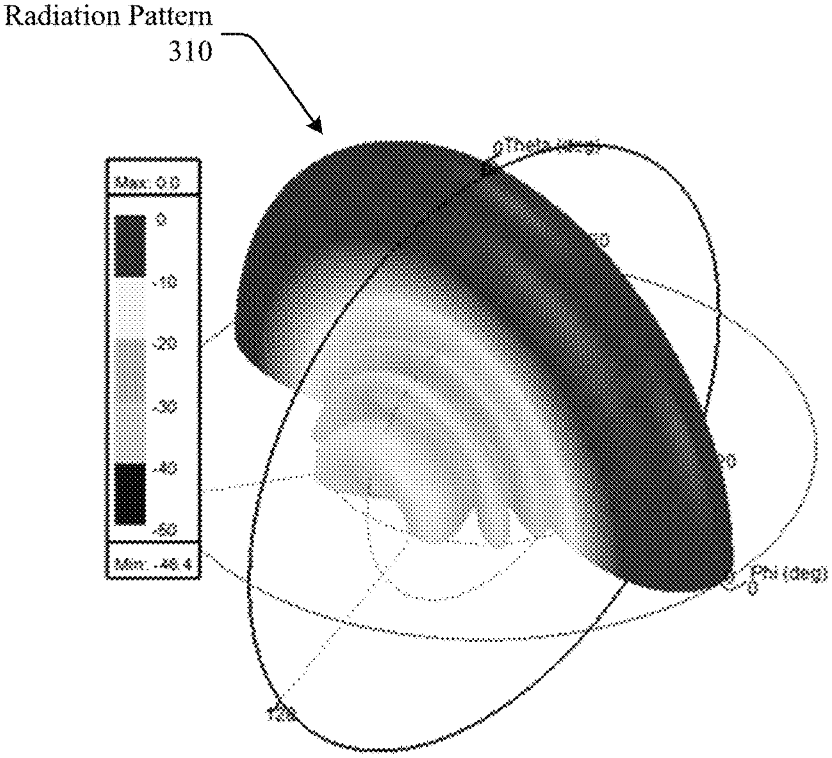

In contrast to FIG. 3A, FIG. 3B illustrates a three-dimensional radiation pattern 310 associated with an example waveguide with a zigzag waveguide channel 112 for suppressing grating lobes. The radiation pattern 310 does not include relatively large grating lobes provides uniform radiation. The example waveguide can include the waveguide 110 illustrated in FIGS. 1 and 2 with the radiation slots 114. The waveguide 110 can generate the radiation pattern 310 with suppressed grating lobes to enable a radar system to focus the radiation pattern of a corresponding antenna on a portion of the field-of-view where potential objects-of-interest are more likely to be located than the radar system can using the radiation pattern 300 illustrated in FIG. 3A. As one example, a radar system placed near the front of a vehicle can use the radiation pattern in one plane to focus on detecting objects immediately in front of the vehicle instead of objects located toward a side of the vehicle.

Figure 4:
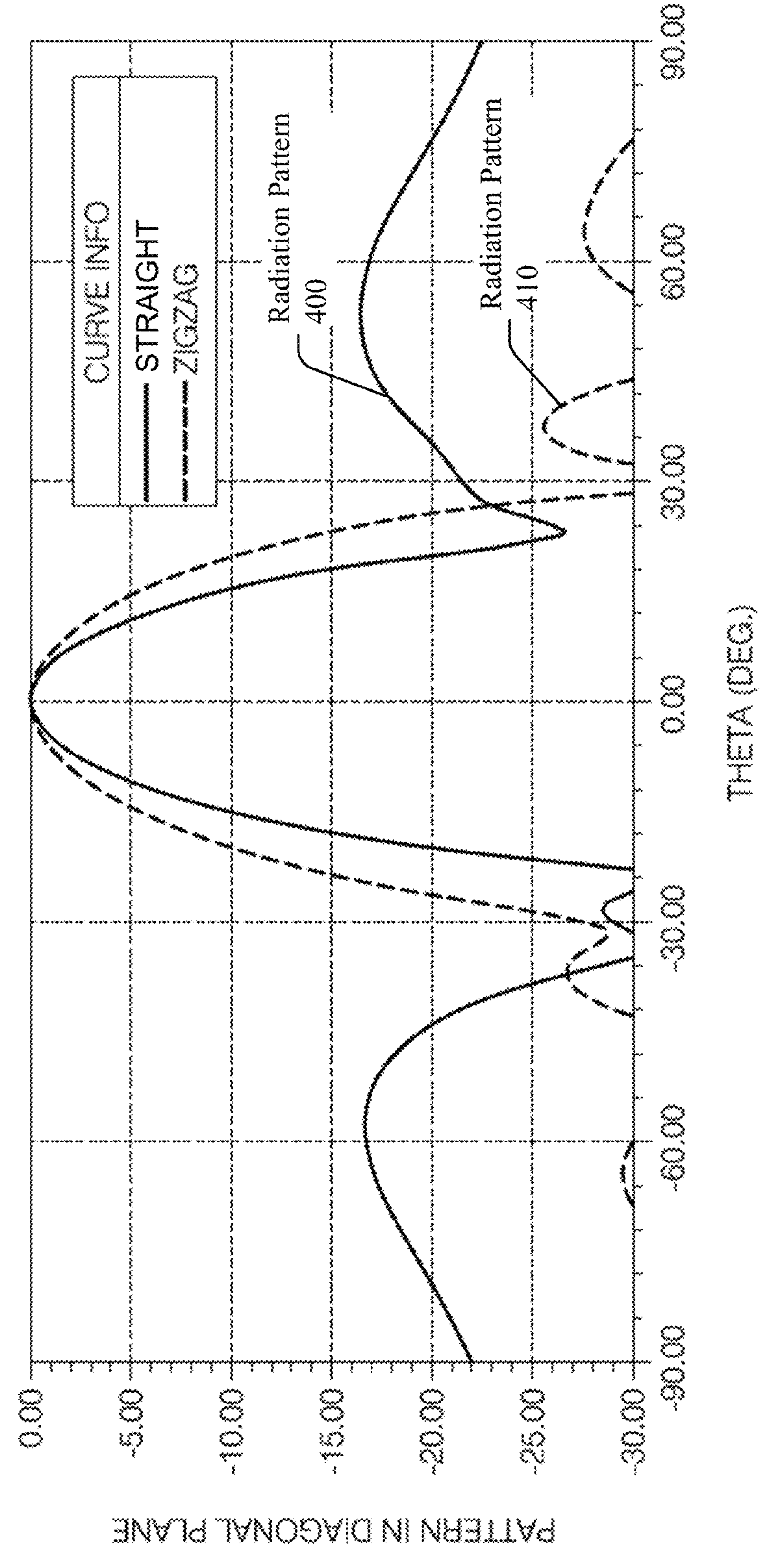
FIG. 4 illustrates radiation patterns in a diagonal plane associated with example radar systems with and without zigzag waveguide channels.

FIG. 4 illustrates radiation patterns 400 and 410 in a diagonal plane associated with example radar systems without and with zigzag waveguide channels, respectively. A radar system with a straight waveguide channel can generate a radiation pattern 400 in the diagonal plane with relatively large grating lobes. For example, in FIG. 4, the maxima of the grating lobes appear at approximately ±50 degrees.

In contrast, a radar system 102 with a zigzag waveguide channel 112 generates the radiation pattern 410 in the diagonal plane. As illustrated by the radiation pattern 410 in FIG. 4, the zigzag waveguide channel 112 can suppress the grating lobes. The suppression of the grating lobes allows the radar system 102 to avoid malfunctioning and more accurately detect the objects 108 in the travel path of the vehicle 104.

Figure 5A:
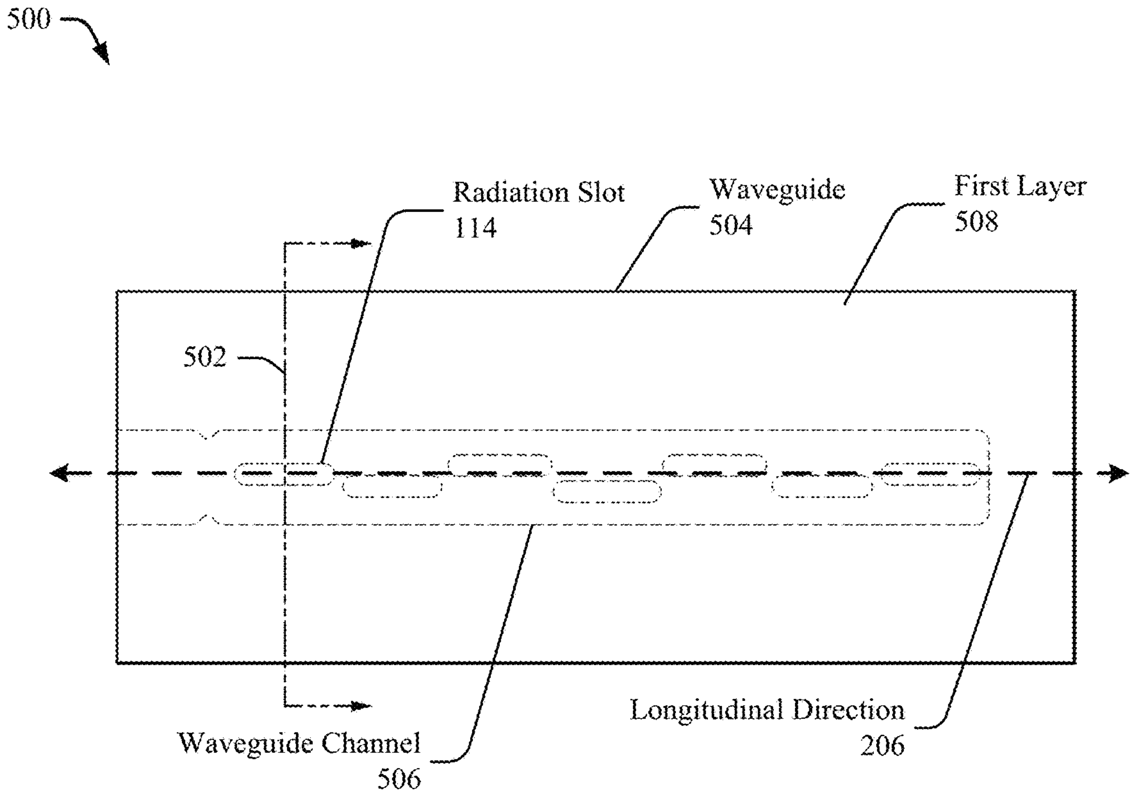
FIGS. 5A and 5B illustrate views of another example waveguide formed in part with a printed circuit board to have a zigzag arrangement of radiation slots.
Figure 5B:
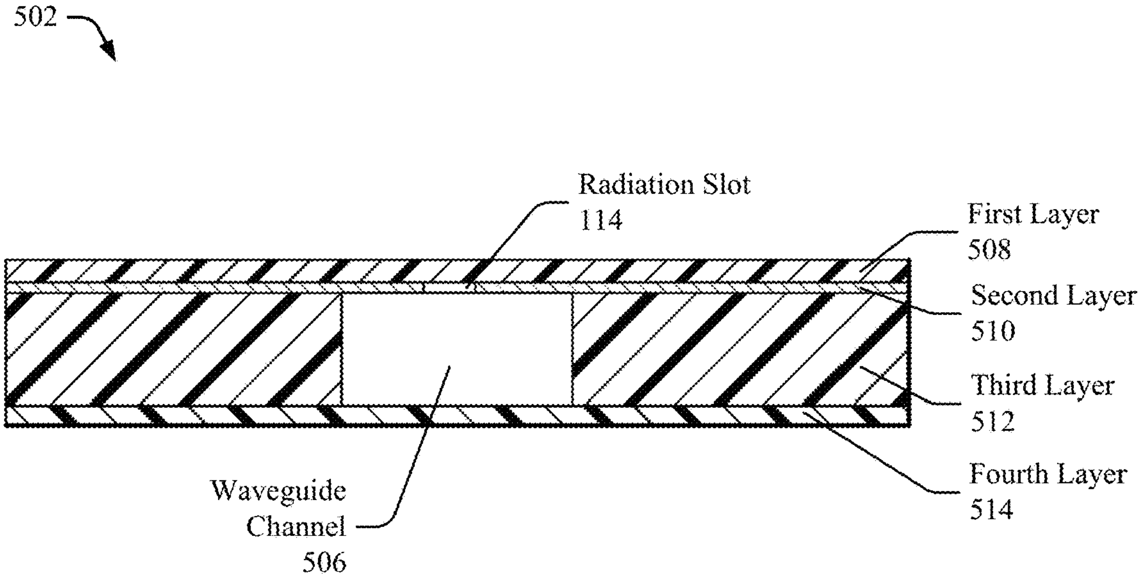

FIG. 5A illustrates a top view 500 of another example waveguide 504 formed in part with a printed circuit board (PCB) to have a zigzag arrangement of radiation slots. FIG. 5B illustrates a cross-section view 502 of the waveguide 504 with a zigzag arrangement of radiation slots. The waveguide 504 includes a waveguide channel 506 and the radiation slots 114.

The waveguide 504 includes a first layer 508, a second layer 510, a third layer 512, and a fourth layer 514. The first layer 508 and the second layer 510 provide a substrate layer and a conductive layer, respectively, of the PCB. The second layer 510 can include various conductive materials, including tin-lead, silver, gold, copper, and so forth, to enable the transport of EM energy. Like the second layer 210 and the third layer 212 illustrated in FIG. 2B, the third layer 512 and the fourth layer 514 form sides and the floor, respectively, of the waveguide channel 506. The third layer 512 and the fourth layer 514 are separate layers in the depicted implementation. In other implementations, the third layer 512 and the fourth layer 514 can be formed as a single layer and combined with the PCB structure to form the waveguide channel 506. The second layer 510 can be etched to form the radiation slots 114 as part of the conductive layer of the PCB.

The use of the PCB structure for the waveguide 504 provides several advantages over the structure of the waveguide 110 illustrated in FIGS. 2A and 2B. For example, using a PCB allows manufacturing of the waveguide 504 to be cheaper, less complicated, and easier for mass production. As another example, using a PCB provides low loss of EM radiation from the input of the waveguide channel 506 to radiation from the radiation slots 114.

The waveguide channel 506 can include a hollow channel for a dielectric. The dielectric generally includes air, and the waveguide 504 is an air waveguide. The waveguide channel 506 forms an opening in a longitudinal direction 206 at one end of the waveguide 504 and a closed wall at an opposite end. An antenna (not illustrated in FIG. 5B) can be electrically coupled to the dielectric via the floor of the waveguide channel 506. EM signals enter the waveguide channel 506 through the opening and exit the waveguide channel 506 via the radiation slots 114. In FIG. 5A, the waveguide channel 506 forms an approximately rectangular shape in the longitudinal direction 206. As discussed with respect to FIGS. 1 through 2B, the waveguide channel 506 can also form a zigzag shape in the longitudinal direction 206.

As depicted in FIG. 5B, the waveguide channel 506 can form an approximately rectangular opening in the cross-section view 502 of the waveguide 504. In other implementations, the waveguide channel 506 can form an approximately square, oval, or circular opening in the cross-section view 502 of the waveguide 504. In other words, the opening to the waveguide channel 506 can have an approximately square shape, oval shape, or circular shape.

The radiation slots 114 are sized and positioned on the second layer 510 to produce a particular radiation pattern for the antenna. For example, at least some of the radiation slots 114 are offset from the longitudinal direction 206 (e.g., a centerline of the waveguide channel 506) by varying or non-uniform distances (e.g., in a zigzag shape) to reduce or eliminate side lobes from the radiation pattern of the waveguide 504. As another example, the radiation slots 114 nearer the wall at the opposite end of the waveguide channel 506 can have a larger longitudinal opening than the radiation slots 114 nearer the opening of the waveguide channel 506. The specific size and position of the radiation slots 114 can be determined by building and optimizing a model of the waveguide 504 to produce the desired radiation pattern.

The plurality of radiation slots 114 is evenly distributed along the waveguide channel 506 between the opening of the waveguide channel and the closed wall. Each adjacent pair of radiation slots 114 are separated along the longitudinal direction 206 by a uniform distance to produce a particular radiation pattern. The uniform distance, which is generally less than one wavelength of the EM radiation, can prevent grating lobes in the radiation pattern.

Figure 6A:
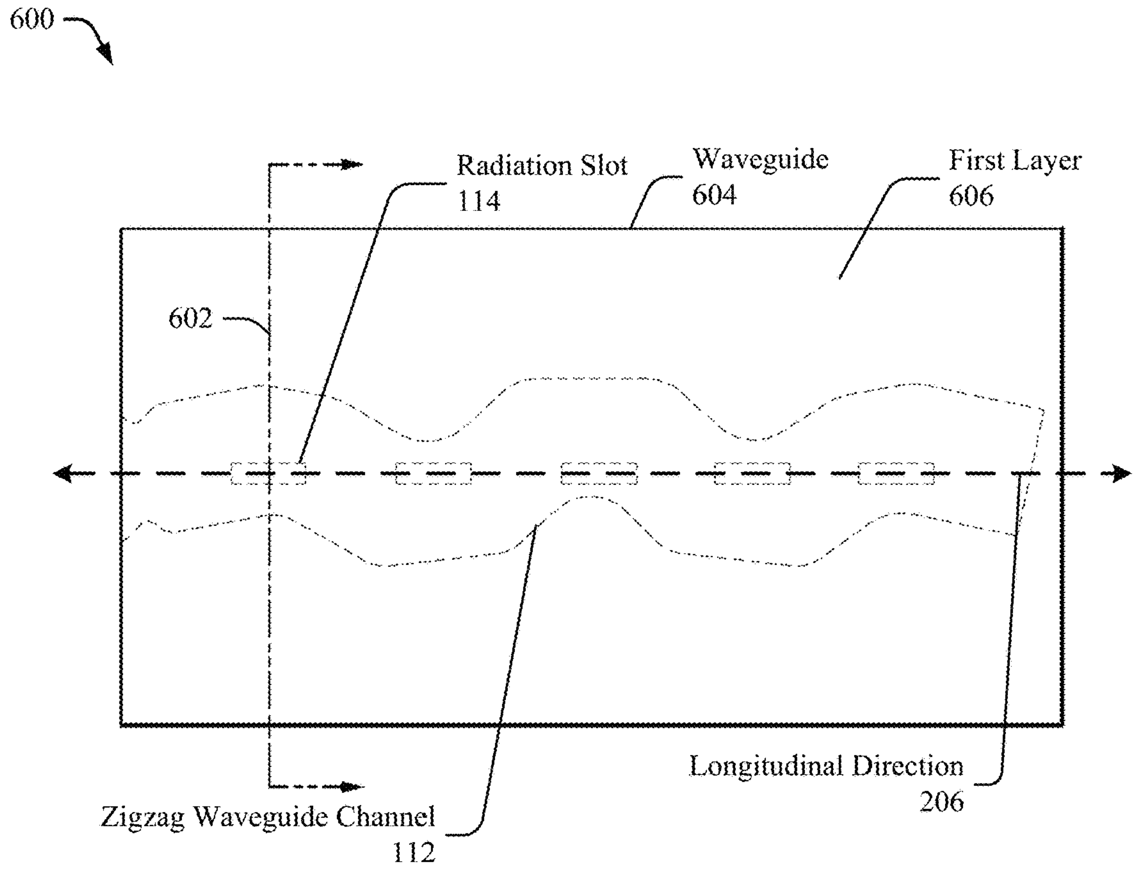
FIGS. 6A and 6B illustrate views of another example waveguide that is formed in part with a printed circuit board to have a zigzag waveguide channel for suppressing grating lobes.
Figure 6B:
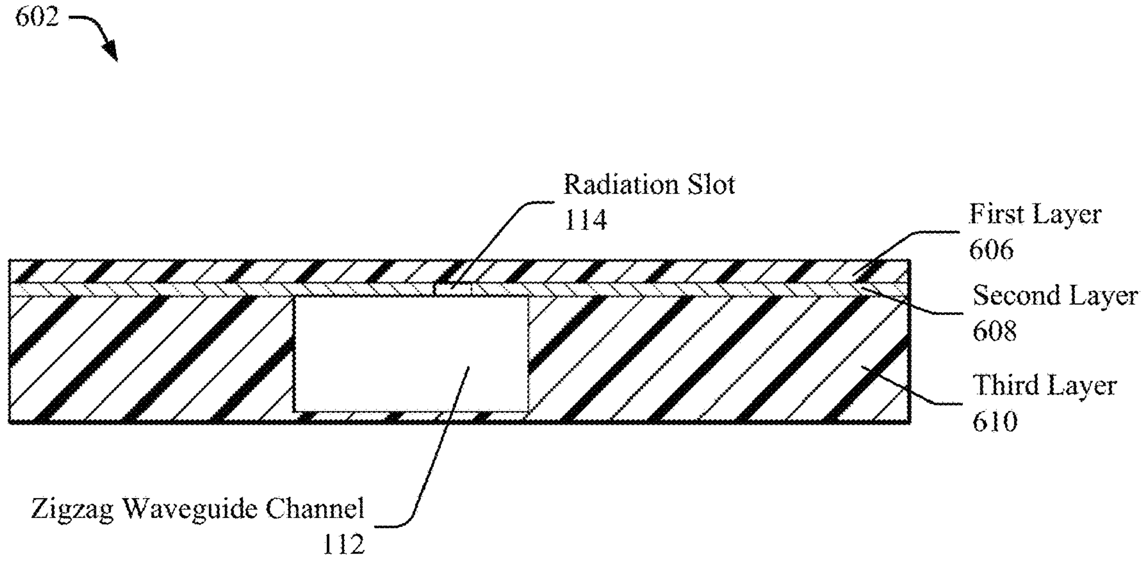

FIG. 6A illustrates a top view 600 of another example waveguide 604 formed in part with a printed circuit board (PCB) to have the zigzag waveguide channel 112. FIG. 6B illustrates a cross-section view 602 of the waveguide 604 with the zigzag waveguide channel 112. The waveguide 604 includes the radiation slots 114.

The waveguide 604 includes a first layer 606, a second layer 608, and a third layer 610. The first layer 606 and the second layer 608 provide a substrate layer and a conductive layer, respectively, of the PCB. The second layer 608 can include various conductive materials, including tin-lead, silver, gold, copper, and so forth, to enable the transport of EM energy. Like the second layer 210 and the third layer 212 illustrated in FIG. 2B, the third layer 610 forms sides and the floor, respectively, of the zigzag waveguide channel 112. The third layer 610 is a single layer in the depicted implementation. In other implementations, the third layer 610 can include multiple layers (e.g., the third layer 512 and the fourth layer 514 as illustrated for the waveguide 504 in FIG. 5B). The second layer 608 can be etched to form the radiation slots 114 as part of the conductive layer of the PCB.

The use of the PCB structure for the waveguide 604 provides several advantages over the structure of the waveguide 110 illustrated in FIGS. 2A and 2B. For example, using a PCB allows manufacturing of the waveguide 604 to be cheaper, less complicated, and easier for mass production. As another example, using a PCB provides low loss of EM radiation from the input of the zigzag waveguide channel 112 to radiation from the radiation slots 114.

As described above, the zigzag waveguide channel 112 can include a hollow channel for a dielectric. The dielectric generally includes air, and the waveguide 604 is an air waveguide. The zigzag waveguide channel 112 forms an opening in a longitudinal direction 206 at one end of the waveguide 604 and a closed wall at an opposite end. An antenna (not illustrated in FIG. 6A or 6B) can be electrically coupled to the dielectric via the floor of the zigzag waveguide channel 112. EM signals enter the zigzag waveguide channel 112 through the opening and exit the zigzag waveguide channel 112 via the radiation slots 114. In FIG. 6A, the zigzag waveguide channel 112 forms a zigzag shape in the longitudinal direction 206.

As depicted in FIG. 6B, the zigzag waveguide channel 112 can form an approximately rectangular opening in the cross-section view 602 of the waveguide 604. In other implementations, the zigzag waveguide channel 112 can form an approximately square, oval, or circular opening in the cross-section view 602 of the waveguide 604. In other words, the opening to the zigzag waveguide channel 112 can have an approximately square shape, oval shape, or circular shape.

The radiation slots 114 are sized and positioned on the second layer 608 to produce a particular radiation pattern for the antenna. For example, the plurality of radiation slots 114 can be evenly distributed along the zigzag waveguide channel 112 between the opening of the zigzag waveguide channel 112 and the closed wall. Each adjacent pair of radiation slots 114 is separated along the longitudinal direction 206 by a uniform distance to produce a particular radiation pattern. The uniform distance, which is generally less than one wavelength of the electromagnetic radiation, can further suppress grating lobes in the radiation pattern. The zigzag shape of the zigzag waveguide channel 112 allows manufacturers to position the radiation slots 114 in an approximately straight line along the longitudinal direction 206. As another example, the radiation slots 114 nearer the wall at the opposite end of the zigzag waveguide channel 112 can have a larger longitudinal opening than the radiation slots 114 nearer the opening of the zigzag waveguide channel 112. The specific size and position of the radiation slots 114 can be determined by building and optimizing a model of the waveguide 604 to produce the desired radiation pattern.

The plurality of radiation slots 114 is evenly distributed along the zigzag waveguide channel 112 between the opening of the zigzag waveguide channel and the closed wall. Each adjacent pair of radiation slots 114 are separated along the longitudinal direction 206 by a uniform distance to produce a particular radiation pattern. The uniform distance, which is generally less than one wavelength of the EM radiation, can prevent grating lobes in the radiation pattern.

Example Methods

Figure 7:
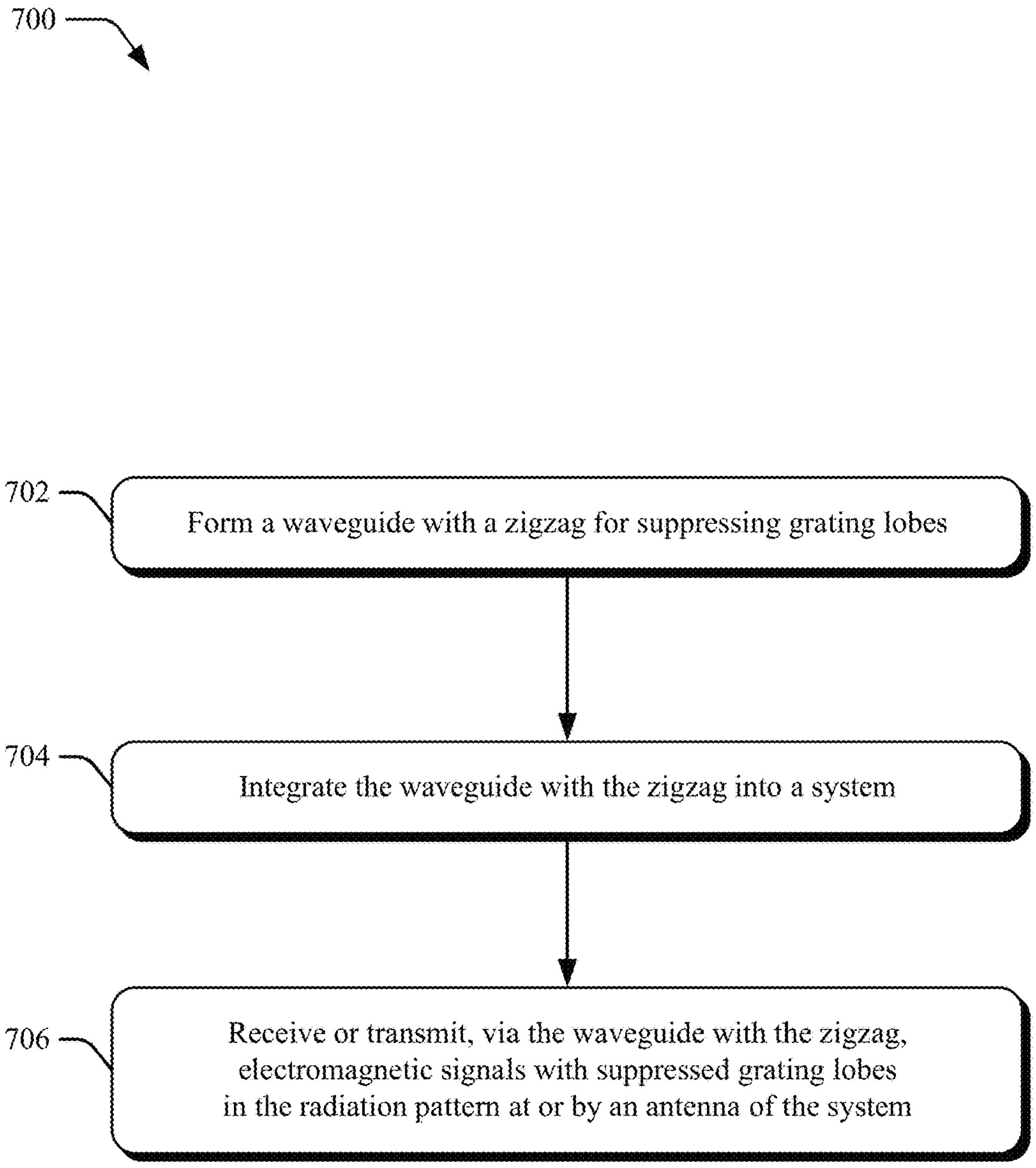
FIG. 7 illustrates an example method for manufacturing a waveguide with a zigzag waveguide for suppressing grating lobes following techniques, apparatuses, and systems of this disclosure.
Figure 8:
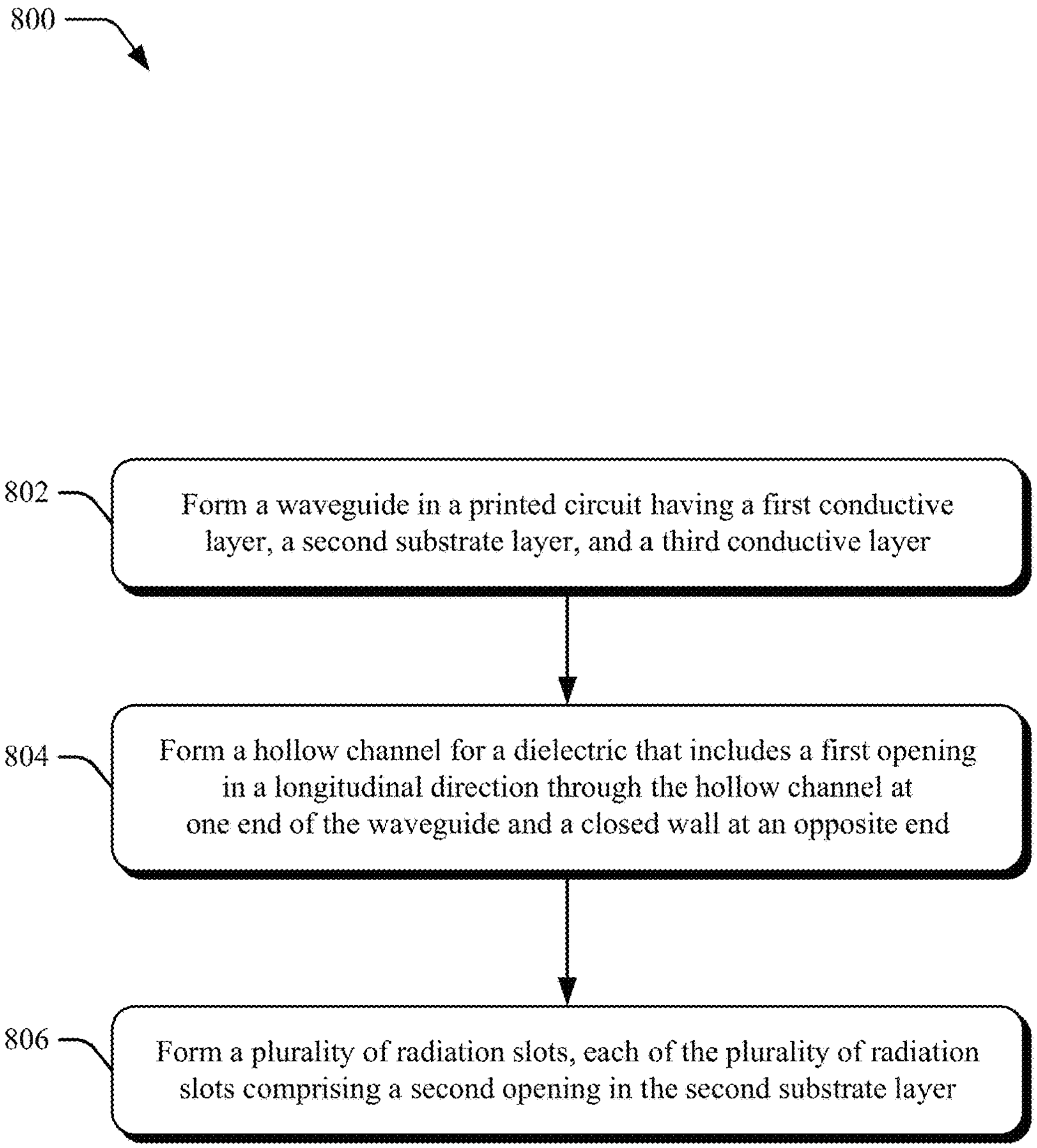
FIG. 8 illustrates an example method for forming a waveguide in part with a printed circuit board, following techniques, apparatuses, and systems of this disclosure.

FIG. 7 illustrates an example method 700 that can be used for manufacturing a waveguide with a zigzag waveguide channel for suppressing grating lobes, following techniques, apparatuses, and systems of this disclosure. FIG. 8 illustrates an example method 800, which is part of the method 700, and is for forming a waveguide in part with a printed circuit board, following techniques, apparatuses, and systems of this disclosure.

Methods 700 and 800 are shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1 and entities detailed in FIGS. 1 through 6, reference to which is made for example only. The techniques are not limited to performance by one entity or multiple entities.

At 702, a waveguide with a zigzag for suppressing grating lobes is formed. For example, the waveguide 110 can be stamped, etched, cut, machined, cast, molded, or formed in some other way. As another example, the waveguide 504 or the waveguide 604 can be stamped, etched, cut, machined, cast, molded, or formed in some other way. The use of the PCB structure for the waveguide 504 or the waveguide 604 can, for example, provide for cheaper, less complex, and easier manufacturing.

At 704, the waveguide with the zigzag is integrated into a system. For example, the waveguide 110, the waveguide 504, and/or the waveguide 604 is electrically coupled to the antenna 204 as part of the radar system 102.

At 706, electromagnetic signals with suppressed grating lobes in the radiation pattern are received or transmitted via the waveguide with the zigzag at or by an antenna of the system, respectively. For example, the antenna 204 receives or transmits signals with suppressed grating lobes in the three-dimensional radiation pattern via the waveguide 110, the waveguide 504, and/or the waveguide 604 and routed through the radar system 102.

In some examples, the method 800 is performed in executing the step 702 from the method 700. At 802, a waveguide is formed in a printed circuit board (PCB). The waveguide can include a first conductive layer, a second substrate layer, and a third conductive layer. For example, the waveguide 504 includes the first layer 508, the second layer 510, the third layer 512, and the fourth layer 514. The first layer 508, the third layer 512, and the fourth layer 514 are conductive layers. The second layer 510 is a substrate layer. As another example, the waveguide 604 includes the first layer 606, the second layer 608, and the third layer 610. The first layer 606 and the third layer 610 are conductive layers. The second layer 608 is a substrate layer.

At 804, a hollow channel for a dielectric is formed in the waveguide. The hollow channel includes a first opening in a longitudinal direction through the hollow channel at one end of the waveguide and a closed wall at an opposite end. The third conductive layer forms a surface of the hollow channel that defines the hollow channel. For example, the waveguide 504 includes the waveguide channel 506 that is hollow and can hold a dielectric (e.g., air). The waveguide channel 506 includes an opening in the longitudinal direction 206 at one end of the waveguide 504 and a closed wall at an opposite end. The third layer 512 and the fourth layer 514 form side surfaces and a bottom surface, respectively, of the waveguide channel 506. As another example, the waveguide 604 includes the zigzag waveguide channel 112 that is hollow and can hold a dielectric (e.g., air). The zigzag waveguide channel 112 includes an opening in the longitudinal direction 206 at one end of the waveguide 604 and a closed wall at an opposite end. The third layer 610 forms side surfaces and a bottom surface of the zigzag waveguide channel 112.

At 806, a plurality of radiation slots are formed in the waveguide. Each of the plurality of radiation slots include a second opening in the second substrate layer and is operably connected with the dielectric. For example, the waveguide 504 and the waveguide 604 include the radiation slots 114 that are operably connected with the dielectric. For the waveguide 504, the radiation slots 114 are formed in the second layer 510. For the waveguide 604, the radiation slots 114 are formed in the second layer 608.

EXAMPLES

In the following section, examples are provided.

Example 1: An apparatus comprising: a waveguide, the waveguide including: a hollow channel for a dielectric that includes an opening in a longitudinal direction through the waveguide at one end of the waveguide and a closed wall at an opposite end of the waveguide, the hollow channel forming a zigzag shape along the longitudinal direction; and a plurality of radiation slots, each of the plurality of radiation slots comprising another opening through a surface of the waveguide that defines the hollow channel, each of the plurality of radiation slots being operably connected with the dielectric.

Example 2: The apparatus of example 1, wherein: the waveguide includes a printed circuit board (PCB) having at least a conductive layer and a substrate layer, the plurality of radiation slots being formed in the conductive layer of the PCB.

Example 3: The apparatus of example 1, wherein the zigzag shape comprises multiple turns along the longitudinal direction, each of the multiple turns having a turning angle between 0 and 90 degrees.

Example 4: The apparatus of example 1, wherein the plurality of radiation slots is positioned along a centerline of the hollow channel, the centerline being parallel with the longitudinal direction through the hollow channel.

Example 5: The apparatus of example 1, the apparatus further comprising an antenna element electrically coupled to the dielectric from a floor of the hollow channel.

Example 6: The apparatus of example 1, wherein the opening comprises an approximately rectangular shape.

Example 7: The apparatus of example 1, wherein the opening comprises an approximately square shape, oval shape, or circular shape.

Example 8: The apparatus of example 1, wherein the plurality of radiation slots is evenly distributed between the opening and the closed wall along the longitudinal direction.

Example 9: The apparatus of example 1, wherein the waveguide comprises at least one of metal or plastic.

Example 10: The apparatus of example 1, wherein the dielectric comprises air and the waveguide is an air waveguide.

Example 11: An apparatus comprising: a waveguide that includes a printed circuit board (PCB) having a first conductive layer, a second substrate layer, and a third conductive layer, the waveguide including: a hollow channel for a dielectric that includes a first opening in a longitudinal direction through the hollow channel at one end of the waveguide and a closed wall at an opposite end of the waveguide, the third conductive layer forming a surface of the hollow channel that defines the hollow channel; and a plurality of radiation slots, each of the plurality of radiation slots comprising a second opening formed in the second substrate layer, each of the plurality of radiation slots being operably connected with the dielectric.

Example 12: The apparatus of example 11, the apparatus further comprising an antenna element electrically coupled to the dielectric from a floor of the hollow channel.

Example 13: The apparatus of example 11, wherein the first opening comprises an approximately rectangular shape and the hollow channel forming another approximately rectangular shape along the longitudinal direction.

Example 14: The apparatus of example 13, wherein the plurality of radiation slots is offset a non-uniform distance from a centerline of the hollow channel, the centerline being parallel with the longitudinal direction.

Example 15: The apparatus of example 11, wherein the second opening comprises an approximately rectangular shape and the hollow channel forms a zigzag shape along the longitudinal direction through the hollow channel, and wherein the plurality of radiation slots is positioned along a centerline of the hollow channel, the centerline being parallel with the longitudinal direction through the hollow channel.

Example 16: The apparatus of example 11, wherein the first opening comprises an approximately square shape, oval shape, or circular shape.

Example 17: The apparatus of example 11, wherein the plurality of radiation slots is evenly distributed between the first opening and the closed wall along the longitudinal direction.

Example 18: The apparatus of example 11, wherein the waveguide comprises at least one of metal or plastic.

Example 19: The apparatus of example 11, wherein the dielectric comprises air and the waveguide is an air waveguide.

Example 20: An apparatus comprising: a waveguide that includes a printed circuit board (PCB) having a first conductive layer, a second substrate layer, and a third conductive layer, the waveguide including: a hollow channel for a dielectric that includes a first opening in a longitudinal direction through the hollow channel at one end of the waveguide and a closed wall at an opposite end of the waveguide, the third conductive layer forming a surface of the hollow channel that defines the hollow channel, the hollow channel forming a zigzag shape along the longitudinal direction; and a plurality of radiation slots, each of the plurality of radiation slots comprising a second opening formed in the second substrate layer, each of the plurality of radiation slots being operably connected with the dielectric.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. An apparatus comprising:

a waveguide that includes a printed circuit board (PCB) having a first substrate layer, a second conductive layer, and a third layer, the waveguide including:

a hollow channel for a dielectric that includes a first opening in a longitudinal direction through the hollow channel at one end of the waveguide and a closed wall at an opposite end of the waveguide, the third conductive layer forming a surface of the hollow channel that defines the hollow channel, the hollow channel forming a zigzag shape along the longitudinal direction, the zigzag shape comprising multiple turns along the longitudinal direction, each of the multiple turns having a turning angle greater than 15 degrees and less than 75 degrees; and a plurality of radiation slots, each of the plurality of radiation slots comprising a second opening formed in the second conductive layer, each of the plurality of radiation slots being operably connected with the dielectric through the hollow channel and positioned along a centerline of the hollow channel that is parallel with the longitudinal direction, each of the plurality of radiation slots being a longitudinal slot parallel to the longitudinal direction and having a rectangular shape, wherein the plurality of radiation slots form a single straight line.

2. The apparatus of claim 1, the apparatus further comprising an antenna element electrically coupled to the dielectric from a floor of the hollow channel.

3. The apparatus of claim 1, wherein the first opening comprises an approximately rectangular shape.

4. The apparatus of claim 1, wherein the first opening comprises an approximately square shape, oval shape, or circular shape.

5. The apparatus of claim 1, wherein the plurality of radiation slots is evenly distributed between the first opening and the closed wall along the longitudinal direction.

6. The apparatus of claim 1, wherein the dielectric comprises air and the waveguide is an air waveguide.

* * * * *